United States Patent [19]

Nohmi et al.

[11] 4,066,230
[45] Jan. 3, 1978

[54] AUTOMATIC BRAKING OR ACCELERATION CONTROL SYSTEM FOR A VEHICLE

[75] Inventors: Makoto Nohmi, Kokubunji; Nobuyuki Fujikura, Hamura; Chiaki Ueda, Mito; Eiichi Toyota, Katsuta, all of Japan

[73] Assignee: Hitachi, Ltd., Japan

[21] Appl. No.: 672,142

[22] Filed: Mar. 31, 1976

[30] Foreign Application Priority Data

Apr. 2, 1975 Japan .................................. 50-39078

[51] Int. Cl.² ................................................ B01L 3/08
[52] U.S. Cl. ............................. 246/182 B; 246/187 B; 364/426
[58] Field of Search .................... 104/1 R, 152, 153; 188/181 A; 235/150.2, 150.24, 151.32; 246/63, 167, 182, 187; 187/29 R; 303/96, 97, 106, 20; 317/5; 324/161–162; 340/53, 62

[56] References Cited

U.S. PATENT DOCUMENTS

| 3,522,973 | 8/1970 | Klein et al. | 188/181 A X |
| 3,652,135 | 3/1972 | Baumann | 303/95 |
| 3,668,524 | 6/1972 | Berry et al. | 303/97 X |
| 3,934,125 | 1/1976 | Macano | 235/150.2 |

Primary Examiner—Stephen G. Kunin
Attorney, Agent, or Firm—Craig & Antonelli

[57] ABSTRACT

In an automatic operating system for a vehicle where the velocity of the vehicle is controlled so as to follow a selected one of a plurality of target velocity patterns, the system comprising first apparatus for predicting a braking or a powering force corresponding to a first target velocity pattern, second apparatus for predicting a braking or a powering force corresponding to a second target velocity pattern and third apparatus for selecting either one of the braking or powering force from the first and second apparatus in response to values of the braking or powering force therefrom.

10 Claims, 11 Drawing Figures

AUTOMATIC BRAKING OR ACCELERATION CONTROL SYSTEM FOR A VEHICLE

BACKGROUND OF THE INVENTION

This invention relates to a system for automatically operating a vehicle, such as a train, an electric car, etc.

In an automatic driving control system for a train or an electric car, for example, the target velocity patterns corresponding to position signals received from a plurality of position markers are generated, and the velocity of the vehicle is controlled so as to follow a selected one of the target velocity patterns.

In such a system, it is well known that, in order to execute station-stop control, a plurality of target decelerating patterns having deceleration values different from each other are generated, and these decelerating patterns are changed when the patterns cross with each other. However, since target deceleration changes abruptly with changing of the patterns, a hunting phenomenon of the command value of braking or powering force occurs. Therefore, the vehicle is uncomfortable to ride in.

SUMMARY OF THE INVENTION

The principal object of this invention is to provide an automatic operating system for a vehicle which controls the vehicle in such a way that it is comfortable to ride in the vehicle. This is accomplished by decreasing the hunting pnenomenon of the command value of the braking or powering force.

In order to achieve such an object, this invention is characterized by providing first means for predicting the braking or powering force corresponding to a first target velocity pattern, second means for predicting the braking or powering force corresponding to a second target velocity pattern, and third means for selecting a braking or powering force in response to the magnitude relationship between the braking or powering force from the first and second means.

DETAILED DESCRIPTION OF THE PRIOR ART

Figure 1:
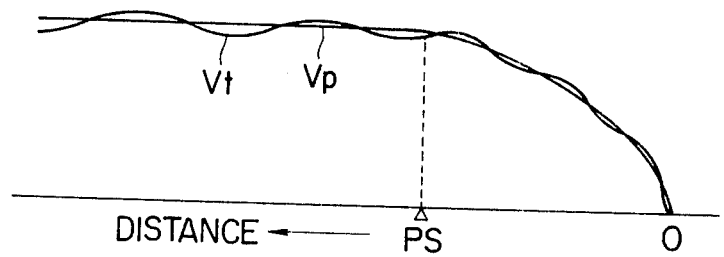
FIG. 1 is a diagram showing the relationship between a target velocity pattern and an actual vehicle velocity.

In an automatic driving control system for a vehicle, such as a train or an electric car, etc., a target velocity pattern signal Vp is generated in response to a position signal PS from a position marker, as shown in FIG. 1, and the actual velocity Vt of the vehicle is controlled so as to follow the target velocity pattern signal Vp as closely as possible.

Figure 2:
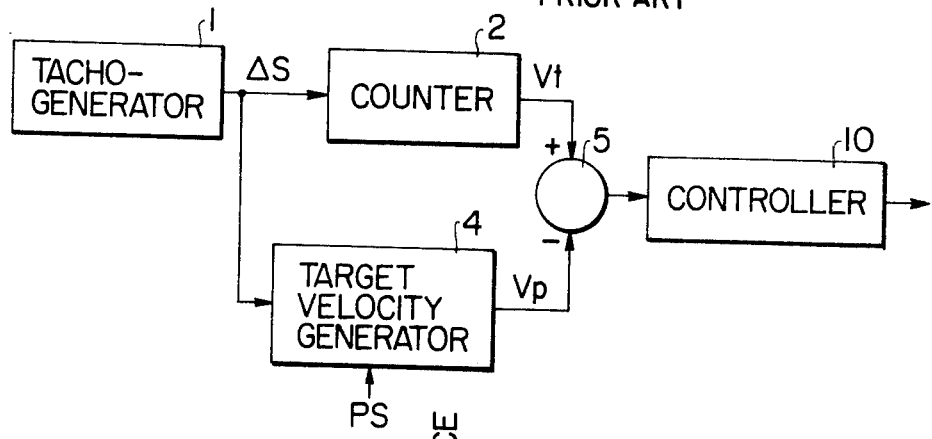
FIG. 2 is a schematic block diagram showing a prior art vehicle operating system.
Figure 3:
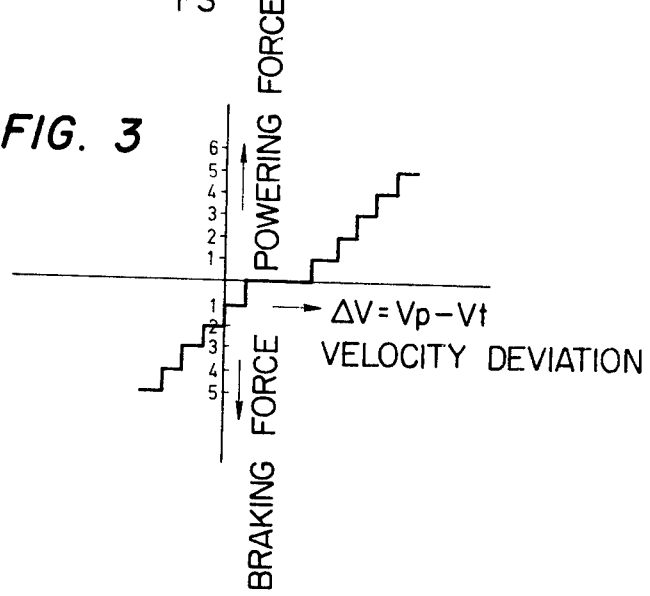
FIG. 3 is a diagram showing the relationship between velocity deviation and braking or powering force.

FIG. 2 shows a prior art automatic driving control system, in which a counter 2 counts the number of distance pulses generated from a tacho-generator 1 coupled with the axle of the vehicle and obtains the actual vehicle Vt of the vehicle by counting the number of distance pulses per unit time. An adder 5 computes the difference between the actual vehicle velocity Vt as derived from the output of counter 2 and the target velocity signal Vp generated from a target velocity generator 4 in response to the pulses from the tacho-generator 1 and the position signal PS from a position marker located at a given point along the railway, thereby to generate braking or powering force signals corresponding to the velocity deviation between signals Vt and Vp, such as shown in FIG. 3, by means of a controller 10.

Figure 4:
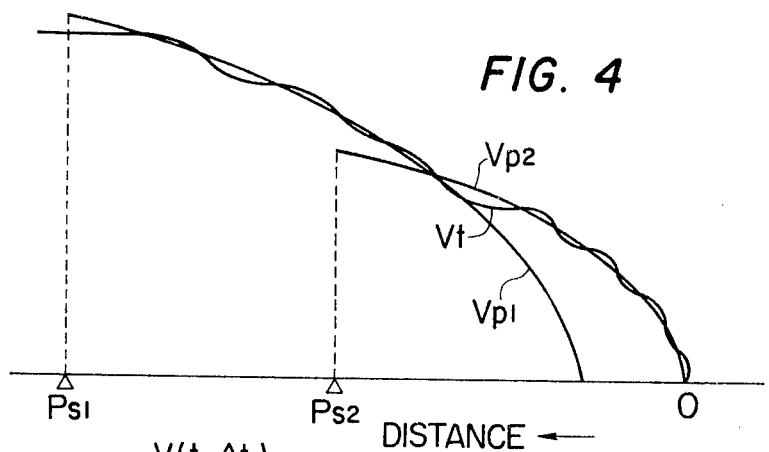
FIG. 4 is a diagram showing the relationship between two target velocity patterns and an actual vehicle velocity.

Since the distance provided to execute station-stop control is long in general, the deviation in the stopping distance of the vehicle measured from the distance pulses provided by generator 1 becomes large when there is any deviation in the diameter of the wheels of the vehicle from standard or any significant amount of slip of the wheels. For this reason, there is known an automatic driving control system in which a plurality of target velocity patterns Vp1 and Vp2 having different deceleration characteristics are generated corresponding to position signals PS1 and PS2 from a pair of position markers, as shown in FIG. 4, and the target velocity pattern is changed from Vp1 to Vp2 when these patterns Vp1 and Vp2 cross each other.

However, in such a system, the actual vehicle velocity Vt does not promptly coincide with the target velocity pattern Vp2 because target deceleration is abruptly changed at the point of switching between patterns. Therefore, when the target velocity pattern is changed from Vp1 to Vp2, the actual vehicle velocity Vt substantially deviates from the target velocity pattern Vp2, as shown in FIG. 4. This phenomenon results from the response delay of the vehicle and the discontinuity of the velocity or deceleration of the target velocity pattern.

Thus, the controlled vehicle is uncomfortable to ride in since its movement becomes irregular because of the hunting of command value of the braking force caused by this phenomenon.

DETAILED DESCRIPTION OF THE PREFERRED EMBODIMENTS

At the outset, the principle of this invention will be explained. In order to compensate for the response delay of the vehicle, it is necessary that the braking force B is controlled as shown in equation (1), if the response delay time is $\Delta t$.

$$B = K_1 \{V(t + \Delta t) - Vp(t + \Delta t) + K_3\} \quad (1)$$

In other words, if the braking force B is controlled at time $t$ in response to the actual vehicle $Vt$ and the target velocity $Vp(t + \Delta t)$ at period $\Delta t$ from time $t$, the vehicle is proportional-controlled as if the response delay is canceled.

Figure 5:
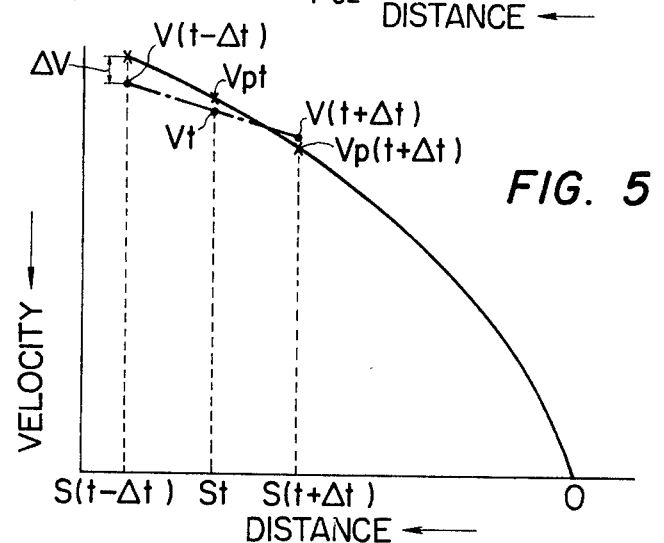
FIG. 5 is a diagram explaining a principle of a vehicle operating system according to this invention.

If it is assumed that the difference between the vehicle velocity Vt at time $t$ and the vehicle velocity $V(t + \Delta t)$ at time $t + \Delta t$ is equal to that between the vehicle velocity $V(t - \Delta t)$ at time $t - \Delta t$ and the vehicle velocity Vt at time $t$ as shown in FIG. 5, $V(t + \Delta t)$ and $Vp(t + \Delta t)$ are obtained by the following equations (2) and (3).

$$V(t - \Delta t) = Vt + \{Vt - V(t - \Delta t)\} \quad (2)$$

$$Vp(t + \Delta t) = Vpt - \beta p \cdot \Delta t \quad (3)$$

In these equations, $V(t - \Delta t)$ represents the vehicle velocity at time $t - \Delta t$, $\beta p$ represents the deceleration of the target velocity pattern Vp, and Vpt represents the target velocity at time $t$.

The following equations (4) and (5) are obtained by means of equations (1) to (3).

$$\beta = K_1 \{Vt - V_{pt} - (\beta t - \beta p) \Delta t + K_3\} \quad (4)$$

$$\beta t = V(t - \Delta t) - Vt/\Delta t \quad (5)$$

Therefore, the braking force B at time $t$ is obtained by adding the item $- (\beta t - \beta p)\Delta t$ to the item Vt $-$ Vpt representative of proportional control.

Figure 6:
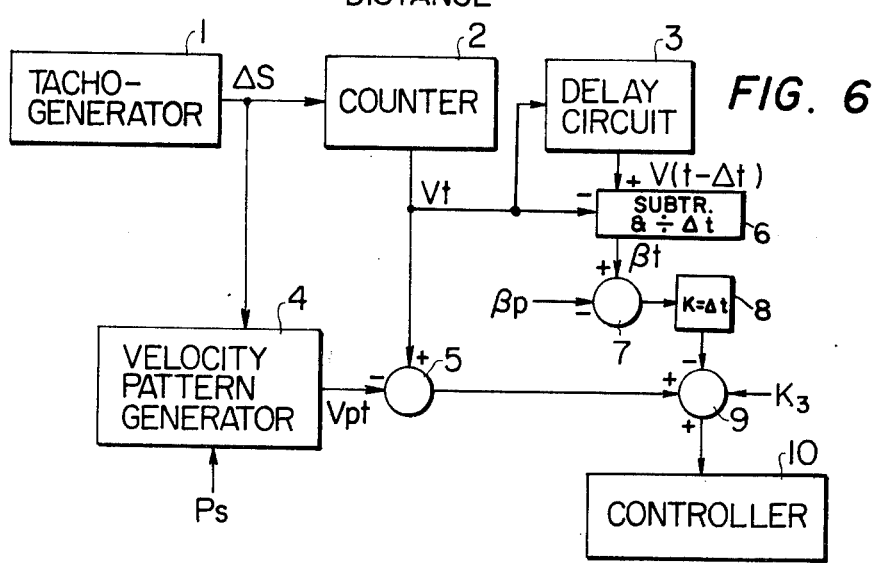
FIG. 6 is a schematic block diagram showing one example of a vehicle operating system according to this invention.

FIG. 6 shows the principal construction of an automatic operating system according to this invention, in which the braking force B is controlled in accordance with equation (4).

In FIG. 6 numeral 1 indicates a tacho-generator which generates distance pulses per given period of time proportional to the transit distance of the vehicle. A counter 2 counts the number of the distance pulses from the tacho-generator 1 and computes the vehicle velocity represented by output signal Vt in response to the number of the distance pulses per unit time. A delay circuit 3 is connected to counter 2 and delays the vehicle velocity signal Vt from the counter 2 by delay time $\Delta t$, thereby to obtain the vehicle velocity signal $V(t - \Delta t)$. A velocity pattern generator 4 generates a target velocity pattern signal Vpt corresponding to the traveled distance determined by the distance pulses from the tacho-generator 1 from the time the position signal PS from the position marker is received. Numerals 6 to 9 indicate computing elements, and numeral 10 indicates a controller which controls the braking force.

With such a construction, a distance pulse is generated every unit distance by the tacho-generator 1 and is applied simultaneously to the counter 2 and the pattern generator 4. The counter 2 counts the number of the distance pulses per unit time and obtains the actual vehicle velocity represented by signal Vt. The vehicle velocity signal Vt is applied to the delay circuit 3 and to computing elements 5 and 6. The delay circuit 3 delays the vehicle velocity signal Vt from the counter 2 by a predetermined delay time $\Delta t$, thereby to obtain the vehicle velocity signal $V(t - \Delta t)$ at period $\Delta t$ before time $t$. The vehicle velocity signal $V(t - \Delta t)$ is applied to computing element 6.

The velocity pattern generator 4 obtains the distance St from a predetermined position, for example, a stop position by means of the distance pulses from the tacho-generator 1 and generates a target velocity pattern signal Vpt, for example, a target decelerating pattern, corresponding to the distance St when the position signal PS is received from the position marker. The target velocity signal Vpt is applied to computing element 5. Computing element 5 subtracts the target velocity signal Vpt from the vehicle velocity signal Vt and applies the difference signal Vt $-$ Vpt to computing element 9.

On the other hand, computing element 6 subtracts the vehicle velocity signal Vt from the vehicle velocity signal $V(t - \Delta t)$ derived from delay circuit 3 and further divides the difference signal $V(t - \Delta t) - Vt$ by $\Delta t$, thereby to obtain the deceleration signal $\beta t$ corresponding to the vehicle velocity Vt at time $t$. The deceleration signal $\beta t$ is applied to computing element 7. This computing element 7 subtracts the target deceleration signal $\beta p$ corresponding to the target velocity pattern Vp from the deceleration signal $\beta t$, thereby to obtain the difference signal $\beta t - \beta p$ between $\beta t$ and $\beta p$ and to apply the difference signal $\beta t - \beta p$ to computing element 8. Computing element 8 multiplies value $\beta t - \beta p$ by the coefficient $k$, where $k = \Delta t$, and applies the thus-obtained value to computing element 9. Computing element 9 subtracts signal $(\beta t - \beta p)\Delta t$ obtained by computing element 8 from signal Vt $-$ Vpt obtained by computing element 5 and further adds the coefficient K3 to the thus-obtained value, thereby to obtain the braking force B according to equation (4). The braking force signal B is applied to the controller 10 and serves to control the controller 10.

The present invention is also applicable to a system wherein the target velocity is changed between two target velocity patterns at a given time as shown in FIG. 4. It is assumed that a first target decelerating pattern Vp1 is initially followed and a second target decelerating pattern Vp2 is followed at a point where the patterns approach one another. Furthermore, it is assumed that the deceleration corresponding to the patterns Vp1 and Vp2 is $\beta p1$ and $\beta p2$, respectively, and the relation between the deceleration of the two patterns is $\beta p1 > \beta p2$. In such a case, the braking force B1 and B2 corresponding to the respective patterns Vp1 and Vp2 is calculated, and the pattern Vp1 or Vp2 corresponding to the smaller braking force B1 or B2 is selected. Therefore, the target velocity pattern relied on for control is changed from the pattern Vp1 to the pattern Vp2 when the braking force B2 becomes smaller than the braking force B1.

In a case where a predicting control operation such as described above is not executed, the changing of the patterns is performed when these patterns cross with each other.

In a case where the predicting control is executed according to this invention, the braking force B2 corresponding to the pattern Vp2 is also calculated before the changing of the patterns and the vehicle deceleration $\beta t$ satisfies the following equation:

$$\beta t \simeq \beta p1 > \beta p2 \quad (6)$$

Therefore, the braking force B2 in equation (4) is reduced by $(\beta t - \beta p2)\Delta t$ corresponding to the force which reduces the brake force relative to the braking force Vt $-$ Vpt for the proportional control. Thus, the target velocity pattern is changed before the pattern Vp2 coincides with the pattern Vp1.

Since the brake is previously slackened by the braking force B2, changing of the patterns is smoothly performed. Therefore, the vehicle is comfortable to ride in and can be stopped correctly at the stop position.

Although the above description applies to a case where a target velocity pattern is changed from a first target decelerating pattern to a second target decelerating pattern, this invention can be adopted for a case where a target velocity pattern is changed from a constant target velocity pattern to a target decelerating pattern, or a case where a target velocity pattern is changed from a target decelerating pattern to a constant target velocity pattern.

In the case where a target velocity pattern is changed from a constant target velocity pattern to a target decelerating pattern, the changing of the patterns is executed when braking force corresponding to the decelerating pattern becomes larger than that corresponding to the constant velocity pattern.

Furthermore, this invention can be adopted for a case where the target velocity pattern is changed from a first target accelerating pattern to a second accelerating pattern or a case where the target velocity pattern is changed from a target accelerating pattern to a constant target velocity pattern.

In such cases the powering force corresponding to two patterns is calculated and the powering force corresponding to one or the other of these patterns is selected.

Figure 7:
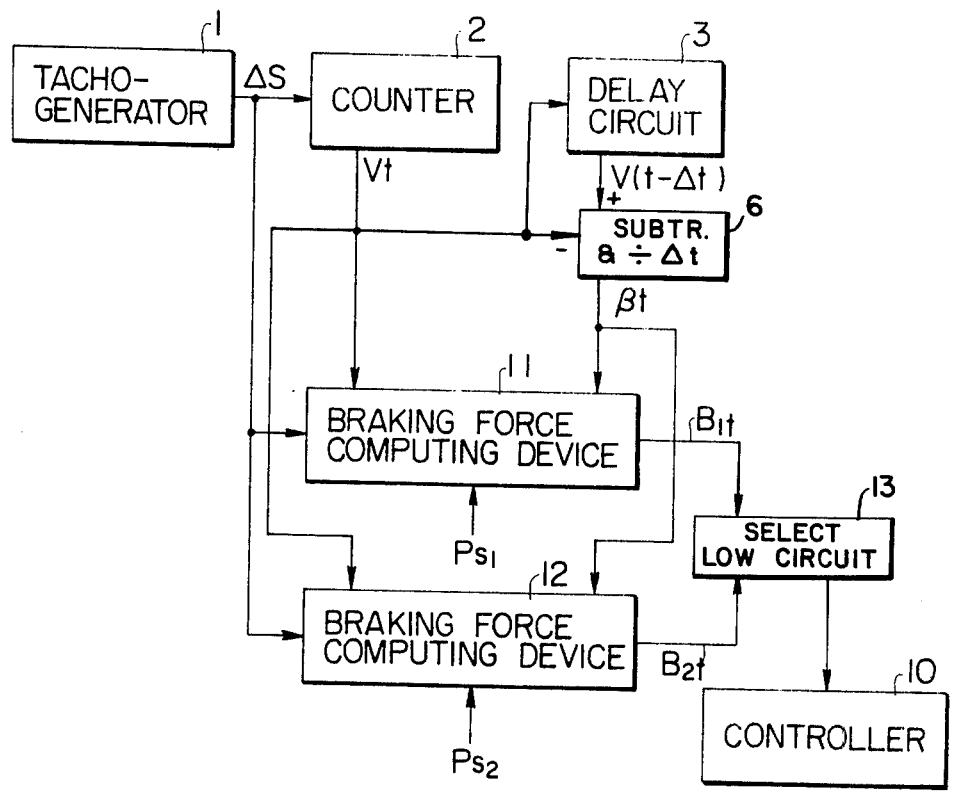
FIG. 7 is a schematic block diagram showing another embodiment of a vehicle operating system according to this invention.

FIG. 7 shows an embodiment of an automatic operating system according to this invention for realizing deceleration control such as described above. In FIG. 7 numerals 11 and 12 identify braking force computing devices which compute the respective braking forces B1 and B2 corresponding to the first and second decelerating patterns $Vp1$ and $Vp2$, respectively, and numeral 13 identifies a selecting circuit which selects one of the braking forces B1 and B2 in response to the values of the forces B1 and B2. Each of other elements corresponds to the element having the same numeral in FIG. 6.

The distance pulses from the tacho-generator 1, the actual vehicle velocity provided by the signal Vt from the counter 2 and the deceleration signal $\beta t$ from computing element 6 are applied to each of the computing devices 11 and 12. Furthermore, position signals PS1 and PS2 from respective position markers are applied to the computing devices 11 and 12, respectively. The braking force signals B1 and B2 obtained by the computing devices 11 and 12, respectively, are applied to the selecting circuit 13. The braking force signal B1 or the signal B2 obtained from the selecting circuit 13 is applied to the controller 10.

In the braking force computing device 11, when the position signal PS1 is received from the position marker, a target decelerating pattern signal $Vp1t$ is generated in response to distance pulses from the tacho-generator 1. Furthermore, by means of vehicle velocity signal Vt from the counter 2, the vehicle deceleration signal $\beta t$ from computing element 6 and the target deceleration signal $\beta p1$ corresponding to the target decelerating pattern signal $Vp1t$, the braking force signal B1t corresponding to the pattern $Vp1t$ is computed in accordance with the following equation:

$$B1t = K_{11}\{Vt - V_{p1t} - (\beta t - \beta p1)K_{21} + K_{31}\} \qquad (7)$$

In this equation (7), $K_{11}$, $K_{21}$ and $K_{31}$ represent coefficients.

In the braking force computing device 12, when the position signal PS2 is received from position marker, a target decelerating pattern signal $Vp2t$ is generated in response to distance pulses from the tacho-generator 1. Furthermore, the braking force signal B2t corresponding to the pattern $Vp2t$ is computed in accordance with the following equation by means of the vehicle velocity signal Vt from the counter 2, the vehicle deceleration signal $\beta t$ from computing element 6 and the target deceleration signal $\beta p2$ corresponding to the target decelerating pattern $Vp2t$:

$$B2t = K_{12}\{Vt - V_{p2t} - (\beta t - \beta p2)K_{22} + K_{32}\} \qquad (8)$$

In this equation (8), $K_{12}$, $K_{22}$ and $K_{32}$ represent coefficients.

In the selecting circuit 13, a comparison between the braking force signals B1t and B2t is performed, and there is selected that one of the braking force signals B1t or B2t which is smaller than the other in value. The selected braking force signal B1t or B2t is applied to the controller 10 as a digital or analog signal. In the controller 10, a command signal corresponding to the braking force from the selecting circuit 13 is applied to the vehicle.

Since the distance from a predetermined position is obtained by the distance pulses from the tacho-generator, the target decelerating pattern signals $Vp1t$ and $Vp2t$ can be generated without the position signals PS1 and PS2 from the position markers.

Although the above-mentioned example relates to a case where two decelerating patterns $Vp1$ and $Vp2$ are used as target velocity patterns, either one of the target velocity patterns may be a constant velocity pattern. In a case where a target velocity pattern is changed from a constant velocity pattern to a decelerating pattern, the braking force which has a value larger than that of the other braking force is selected by the selecting circuit 13.

Figure 8A:
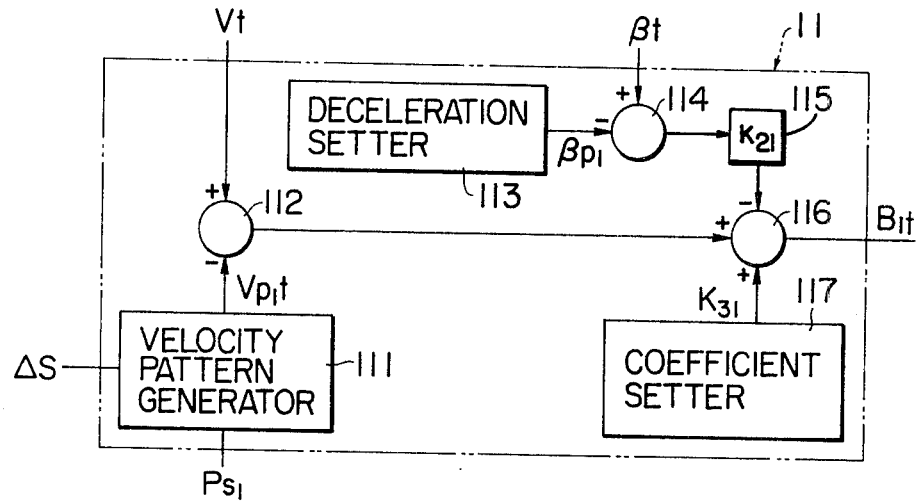
FIGS. 8a, 8b, and 9 are schematic block diagrams showing exemplary constructions of various elements of the vehicle operating system of FIG. 7, according to this invention.
Figure 8B:
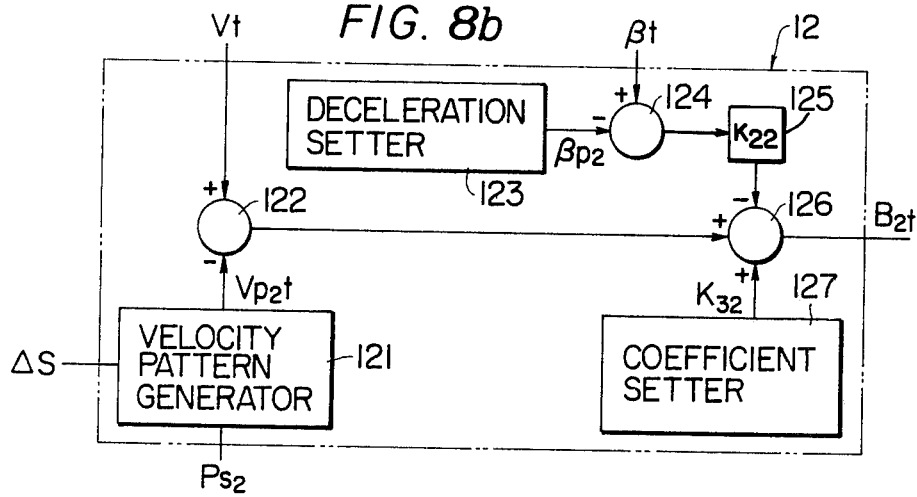

FIGS. 8a and 8b show an example of the construction of selected elements of the embodiment of FIG. 7, that is, the braking force computing devices 11 and 12, respectively.

In FIGS. 8a-8b numerals 111 and 112 indicate velocity pattern generators which generate the respective target decelerating pattern signals $Vp1t$ and $Vp2t$ in response to the distance pulses from the tacho-generator 1 when the position signals PS1 and PS2 from the position markers are received. Numerals 112, 114 to 116, 122, and 124 to 126 designate conventional computing elements; numerals 113 and 123 designate deceleration setters which generate the deceleration signals $\beta p1$ and $\beta p2$ corresponding to the decelerating patterns $Vp1t$ and $Vp2t$, respectively; and, numerals 117 and 127 designate coefficient setters which generate the respective coefficient signals $K_{31}$ and $K_{32}$. The vehicle velocity signal Vt is applied to computing elements 112 and 122 and the vehicle deceleration signal $\beta t$ is applied to computing elements 114 and 124.

With such a construction, the operation of the computing device is now explained. When position signal PS1 is received, pattern generator 111 generates the decelerating pattern signal Vp1t in response to the distance pulses $\Delta S$. Computing element 112 subtracts the decelerating pattern signal Vp1t from the vehicle velocity signal Vt, thereby to apply the difference $Vt - Vp1t$ to computing element 116.

On the other hand, computing element 114 subtracts the deceleration signal $\beta p1$ generated in setter 113 from the vehicle deceleration signal $\beta t$, thereby to apply the difference signal $\beta t - \beta p1$ to computing element 115. Computing element 115 multiplies the difference signal $\beta t - \beta p1$ by coefficient signal $K_{21}$, thereby to apply the multiplied result to computing element 116. This computing element 116 subtracts the output of computing element 115 from the output of computing element 112 and adds coefficient signal $K_{31}$ generated in setter 117 to the subtracted result, thereby to obtain braking force signal B1t shown by equation (7).

The explanation of the operation of computing device 12 is omitted because the operation of this computing device 12 is similar to that of computing device 11.

Figure 9:
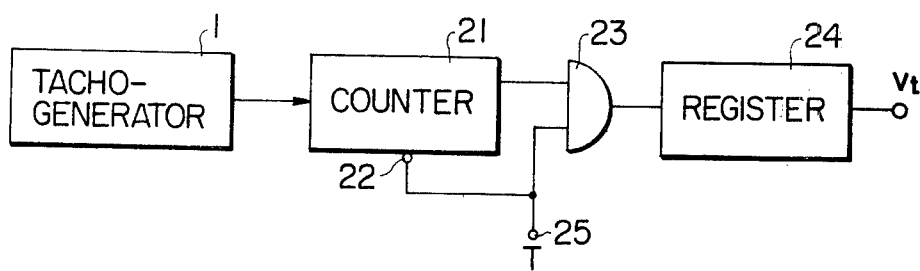

FIG. 9 shows an embodiment of an exemplary construction of the counter 2 shown in FIG. 7. In FIG. 9 a counter 21 having a clear terminal 22 counts the number of distance pulses received from the tacho-generator 1. An AND gate 23 has one input connected to the output of counter 21 and an output connected to a register 24. An input terminal 25 which receives a timing pulse T every unit time is connected to the clear terminal 22 of counter 21 and to a second input of AND gate 23.

With such a construction, the distance pulses from the tacho-generator 1 are applied to the counter 21 and are counted by the counter 21. When the timing pulse T is applied to the clear terminal 22 of the counter 21 and the AND gate 23, the contents of the counter 21 are applied through the AND gate 23 to the register 24 and, at the same time, the counter 21 is cleared. Therefore, the number of distance pulses per unit time is stored in the register 24. The contents of the register 24 represent the vehicle velocity Vt.

A delay line or a memory can be used as the delay circuit 3. Furthermore, each of the velocity pattern generators 111 and 121 of FIGS. 8a – 8b can be provided in the form of a function generator which generates a function, that is, a velocity pattern corresponding to the distance value determined from the distance pulses, or a read only memory (ROM) which stores the velocity pattern read out successively in response to the distance value. The computing elements can be formed by an adder, a multiplexer, a divider, or various combinations thereof.

Although the invention is described above in terms of decelerating control, accelerating control can be performed according to this invention. In such accelerating control, powering force computing devices are substituted for the braking force computing devices 11 and 12.

Such systems as described above are suitable for control having a constant response delay time, such as only braking control or only powering control. However, the change between braking control and powering control occurs in the control of the vehicle. In such case, larger response delay is caused at the changing of control. Therefore, the above-described systems are insufficient to compensate for this large response delay.

On the other hand, if there is used a system suitable for control having a large response delay time, such a system is unsuitable for control having constant response delay time because of the excessive compensation which causes a hunting of command value.

Figure 10:
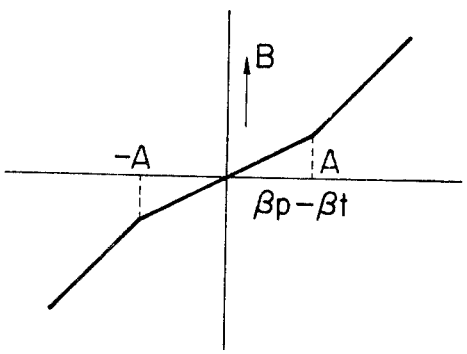
FIG. 10 is a diagram showing the relationship between the deviation of deceleration or acceleration and braking or powering force according to this invention.

In order to solve such problems, the relationship between the difference $\beta p - \beta t$ of the deceleration and the braking force B is represented by a polygonal line as shown in FIG. 10 so as to compensate for response delay at two different grades. When the difference between the vehicle deceleration $\beta t$ and the target deceleration $\beta p$ is small, a relatively small braking force is required. On the other hand, when the vehicle deceleration $\beta t$ departs from the target deceleration $\beta p$, a relatively large braking force is called for. That is, it is determined whether or not the magnitude of $|\beta t - \beta p|$ extends beyond a predetermined threshold level A and a relatively large value or a relatively small value is selected as the coefficient $K_2$ ($K_{21}$, $K_{22}$) in response to whether or not this magnitude extends beyond the level A. It is also possible to select the coefficient $K_2$ in response to $\beta_p - \beta t$ as shown in the following equation:

$$K_2 = f(\beta p - \beta t) \tag{9}$$

The relationship described above is also adopted for the relationship between the acceleration difference and the powering force in accelerating control.

While we have shown and described an embodiment in accordance with the present invention, it is understood that the same is not limited thereto but is susceptible of numerous changes and modifications as known to those skilled in the art and we, therefore, do not wish to be limited to the details shown and described herein but intend to cover all such changes and modifications as are encompassed by the scope of the appended claims.

What is claimed is:

1. An automatic braking and acceleration control system for a vehicle comprising
   first means responsive to a first target velocity pattern and the measured vehicle velocity for generating a first vehicle control signal;
   second means responsive to a second target velocity pattern and the measured vehicle velocity for generating a second vehicle control signal;
   third means for controlling the velocity of said vehicle; and
   fourth means responsive to the relative magnitudes of said first and second vehicle control signals for applying one of said first and second vehicle control signals to said third means in control thereof.

2. An automatic velocity control system for a vehicle comprising
   first means for generating distance pulse signals proportional to the transit distance of the vehicle;
   second means responsive to the distance pulse signals of said first means for generating a velocity signal corresponding to the vehicle velocity;
   third means for delaying said velocity signal from said second means by a predetermined time;
   fourth means responsive to a first target velocity pattern and the output of said first means for generating a first vehicle control signal;
   fifth means responsive to a second target velocity pattern and the output of said first means for generating a second vehicle control signal;
   sixth means for controlling the velocity of the vehicle; and
   seventh means for applying to said sixth means a selected one of said first and second vehicle control signals in control thereof.

3. An automatic velocity control system as defined in claim 2 wherein each of said fourth and fifth means includes eighth means for generating a target velocity pattern signal in accordance with the position of the vehicle with respect to a given position.

4. An automatic velocity control system as defined in claim 3 wherein each of said fourth and fifth means further includes ninth means responsive to the outputs of said second and third means for generating a signal representing acceleration or deceleration of the vehicle.

5. An automatic braking or acceleration control system as defined in claim 4 wherein said ninth means comprises a subtractor for obtaining the difference between the actual vehicle velocity as indicated by the output of said second means and a previous velocity value as indicated by the output of said third means.

6. An automatic velocity control system as defined in claim 4 wherein each of said fourth and fifth means further includes tenth means responsive to the outputs of said second and eighth means for generating a signal corresponding to the difference between the actual vehicle velocity and the target velocity pattern.

7. An automatic velocity control system as defined in claim 6 wherein each of said fourth and fifth means further includes eleventh means for generating a deceleration signal corresponding to said target velocity pattern, twelfth means responsive to said ninth means and said eleventh means for generating a signal corresponding to the difference between the outputs of said ninth and eleventh means, thirteenth means for multiplying the output of said twelfth means by a coefficient value and fourteenth means for obtaining the difference between the outputs of said tenth and thirteenth means to generate a vehicle control signal.

8. An automatic braking or acceleration control system as defined in claim 3, in which said eighth means includes ninth means for transmitting a position signal, and tenth means, connected with said ninth means, for generating the target velocity pattern signal in response to the position signal.

9. An automatic braking or acceleration control system as defined in claim 8, in which said tenth means includes a pattern generator.

10. An automatic braking or acceleration control system for a vehicle comprising:

first means for generating a first signal corresponding to the actual velocity of the vehicle;

second means for generating a second signal corresponding to a target velocity pattern in accordance with the positions of the vehicle;

third means, connected with said first means, for generating a third signal corresponding to the actual acceleration or deceleration of the vehicle in accordance with the first signal;

fourth means for generating a fourth signal corresponding to a target acceleration or deceleration;

fifth means, connected with said first and second means, for subtracting the second signal from the first signal, so as to generate a fifth signal corresponding to the difference between the first and second signals;

sixth means, connected with said third and fourth means, for subtracting the fourth signal from the third signal so as to generate a sixth signal corresponding to the difference between the third and fourth signals;

seventh means, connected with said fifth and sixth means, for subtracting the sixth signal from the fifth signal so as to generate a seventh signal corresponding to the difference between the fifth and sixth signals; and eighth means, connected with said seventh means, for generating a braking or acceleration force in response to the seventh signal, and wherein said sixth means includes ninth means for multiplying the sixth signal by a constant value, and said seventh means includes tenth means for adding a constant value to the seventh signal.

* * * * *